United States Patent
Park

(10) Patent No.: US 8,463,541 B2
(45) Date of Patent: Jun. 11, 2013

(54) CAMERA-BASED INDOOR POSITION RECOGNITION APPARATUS AND METHOD

(75) Inventor: Nam-Shik Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 8 days.

(21) Appl. No.: 13/326,302

(22) Filed: Dec. 14, 2011

(65) Prior Publication Data

US 2012/0158282 A1   Jun. 21, 2012

(30) Foreign Application Priority Data

Dec. 15, 2010  (KR) .................. 10-2010-0128396

(51) Int. Cl.
*G01C 21/00* (2006.01)
(52) U.S. Cl.
USPC ............................................................. 701/409
(58) Field of Classification Search
USPC ............................................................. 701/409
See application file for complete search history.

(56) References Cited

U.S. PATENT DOCUMENTS

| | | | | |
|---|---|---|---|---|
| 7,184,586 B2* | 2/2007 | Jeon et al. | ...................... | 382/153 |
| 7,765,027 B2* | 7/2010 | Hong et al. | ................... | 700/245 |
| 7,840,308 B2* | 11/2010 | Matsunaga et al. | ........... | 700/254 |
| 8,024,072 B2 | 9/2011 | Park et al. | | |
| 8,027,515 B2* | 9/2011 | Lee et al. | ...................... | 382/103 |
| 2004/0016077 A1* | 1/2004 | Song et al. | ...................... | 15/319 |
| 2010/0188510 A1* | 7/2010 | Yoo et al. | ...................... | 348/164 |

FOREIGN PATENT DOCUMENTS

| KR | 10-0485696 A | 4/2005 |
|---|---|---|
| KR | 10-0564236 A | 3/2006 |
| KR | 2009-0088516 A | 8/2009 |
| KR | 2010-0026776 A | 3/2010 |

* cited by examiner

*Primary Examiner* — Thomas Tarcza
*Assistant Examiner* — Alex C Dunn
(74) *Attorney, Agent, or Firm* — Rabin & Berdo, P.C.

(57) ABSTRACT

A camera-based indoor position recognition apparatus includes: a floor capturing unit capturing a floor image by controlling a camera installed on a ceiling of an indoor space; a grid map generator constructing a grid map including cell images and position values by dividing the captured floor image into cells of a predetermined size and assigning the position values to the cells; a transceiver performing a data communication with a robot in the indoor space; and a controller providing an identifier-registration and a current position-information to the robot in accordance with an identifier-registration-requesting message and a position-information-requesting message of the robot, wherein the identifier-registration-requesting message and the position-information-requesting message of the robot are delivered from the transceiver.

20 Claims, 5 Drawing Sheets

CAMERA-BASED INDOOR POSITION RECOGNITION APPARATUS AND METHOD

CROSS-REFERENCE TO RELATED APPLICATION(S)

The present invention claims priority of Korean Patent Application No. 10-2010-0128396, filed on Dec. 15, 2010, which is incorporated herein by reference.

FIELD OF THE INVENTION

The present invention relates to a camera-based indoor position recognition apparatus and a method thereof; and, more particularly, to a camera-based indoor position recognition apparatus and a method, for recognizing a position of a robot by providing a position-information analyzed by a camera installed on a ceiling of an indoor space.

BACKGROUND OF THE INVENTION

Generally, an indoor position-recognition method is needed to recognize a position of a moving feature such as a human or a robot in an indoor space. Meanwhile, a position-recognition method based on GPS (global positioning system) is generally used to provide a location based service, public safety service, position chasing service, and navigation service, etc. in outdoor environment.

However, it is impossible to receive a GPS signal in indoor environment. Accordingly, indoor position-recognition methods based on infrared, ultrasonic wave, RF (Radio Frequency) signal, UWB (ultra wideband), and image information, etc. are generally used in indoor space.

For example, it is essential for a robot such as a clean-up robot to recognize indoor position.

An indoor position-recognition technology based on vision process needs an artificial identifier for identifying objects in indoor space and locations thereof. In accordance with level of recognition, a lot of identifier may be required.

There is no limit on the number of the identifiers. Some artificial identifiers easily found in indoor space usually have repeating patterns. These kinds of identifiers are suitable for indoor position-recognition. Therefore, additional constitutions for indoor position-recognition are required.

Moreover, vision process type-indoor position recognition technology requires a robot to have high performance hardware, that needs high cost. Also, it is impossible for a robot to have vision processing ability to recognize objects therearound.

SUMMARY OF THE INVENTION

In view of the above, the present invention provides a camera-based indoor position recognition apparatus and a method, for recognizing a position of a robot by providing a position-information analyzed by a camera installed on a ceiling of an indoor space.

In accordance with a first aspect of the present invention, there is provided a camera-based indoor position recognition apparatus, which includes:
a floor capturing unit capturing a floor image by controlling a camera installed on a ceiling of an indoor space;
a grid map generator constructing a grid map including cell images and position values by dividing the captured floor image into cells of a predetermined size and assigning the position values to the cells;
a transceiver performing a wireless data communication with a robot in the indoor space; and
a controller controlling the floor capturing unit and the grid map generator, and providing an identifier-registration and a current position-information to the robot in accordance with an identifier-registration-requesting message and a position-information-requesting message of the robot, wherein the identifier-registration-requesting message and the position-information-requesting message of the robot are delivered from the transceiver.

In accordance with a second aspect of the present invention, there is provided a camera-based indoor position recognition method, which includes:
capturing, at a floor capturing unit, a floor image by controlling a camera installed on a ceiling of an indoor space;
constructing, at a grid map generator, a grid map including cell images and position values by dividing the captured floor image into cells of a predetermined size and assigning the position values to the cells;
performing, at a transceiver, a wireless data communication with a robot in the indoor space; and
controlling, at a controller, the floor capturing unit and the grid map generator, and providing an identifier-registration and a current position-information to the robot in accordance with an identifier-registration-requesting message and a position-information-requesting message of the robot, wherein the identifier-registration-requesting message and the position-information-requesting message of the robot are delivered from the transceiver.

In accordance with a third aspect of the present invention, there is provided a camera-based indoor position recognition method, which includes:
transmitting an identifier-registration-requesting message including a robot name and an identifier image of a robot to a position recognition apparatus, wherein the robot is located in an indoor space and the robot is wirelessly connected with the position recognition apparatus;
receiving a identifier-registration-completion message from the position recognition apparatus;
transmitting a position-information-requesting message including the robot name of the robot to the position recognition apparatus; and
receiving a position-information-answering message including a current-position-information from the position recognition apparatus.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings which form a part hereof.

Figure 1A:
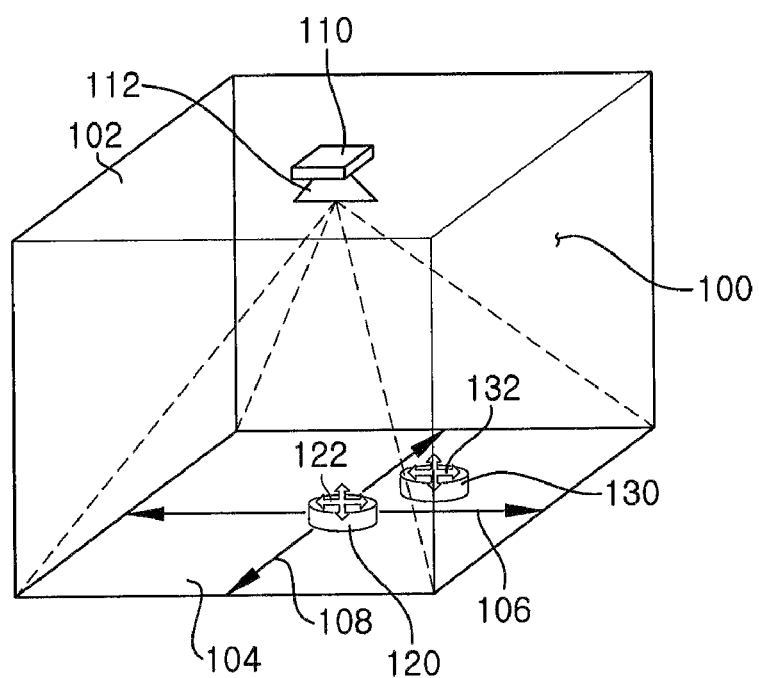
FIG. 1A is a schematic diagram showing a camera-based position recognition system in accordance with an embodiment of the present invention.

FIG. 1A is a schematic diagram showing a camera-based position recognition system in accordance with an embodiment of the present invention.

Referring to FIG. 1A, an indoor space 100 is a general indoor space such as a living room of a house or an office. The indoor space 100 includes a ceiling 102, floor 104, and walls or pillars between the ceiling 102 and floor 104.

A position recognition apparatus 110 including a camera 112 is installed on the ceiling 102 of the indoor space 100. The camera 112 faces the floor 104, and is installed so that an extended line from the camera 112 is vertical to the floor 104.

Figure 1B:
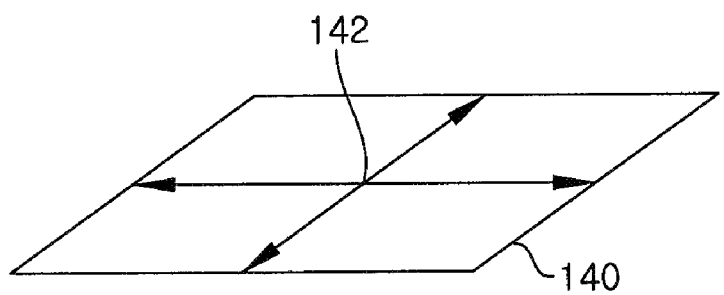
FIG. 1B illustrates a floor divided into a plurality of cells by gradations of an X-axis and a Y-axis, which have a plurality of gradations thereon.

As shown in FIG. 1B, the floor 104 may be divided by an X-axis 106 and a Y-axis 108, which have a plurality of gradations thereon. The floor 104 may be divided into a plurality of cells by gradations of the X-axis 106 and the Y-axis 108.

Robots 120 and 130 respectively have their own identifiers 122 and 132 assigned to themselves. When a first robot 120 having the identifier 122 moves to a position of a second robot 130 on the floor 104, the first robot 120 requests a position of the second robot 130 to the position recognition apparatus 110, and then receives the position of the second robot 130 from the position recognition apparatus 110.

Figure 1C:
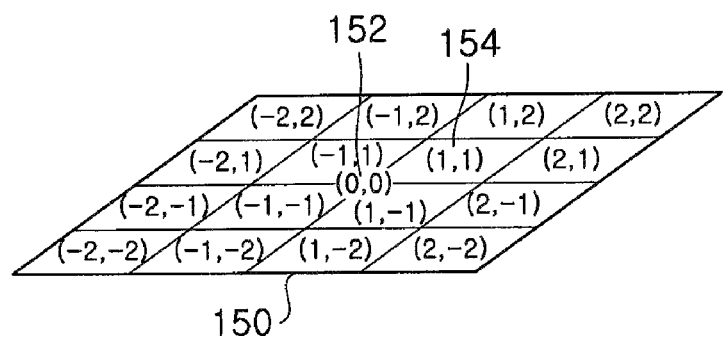
FIG. 1C illustrates a grid map constituted using the image of the floor of FIG. 1A.

The camera 112 is installed to face a cross section point 142 of the X-axis and the Y-axis on the floor 104, and takes a picture of the floor 104. The position recognition apparatus 110 constitutes a grid map 150 using the image 140 of the floor 104 as shown in FIG. 1C.

The grid map 150 includes a plurality of image cells FI(x, y), into which the image 140 of the floor 104 is divided by unit cells. The position recognition apparatus 110 sets the cross section point 142 on the image 140 of the floor to be a center point (0, 0) of the grid map 150, and assigns values expressed by Equation 1 as follows to each image cell P(x, y) corresponding to each coordinate (x, y) on the floor 104, as the grid map 150 shown in FIG. 1C.

$$P(x, y) = \{(x, y) | -|x_{left}| \leq x \leq |x_{right}|, -|y_{down}| \leq y \leq |y_{up}|,$$
$$(x \neq 0 \land y \neq 0, x \text{ and } y \text{ are integers})\} \text{tm [Equation 1]}$$

The grid map 150 defined as follows.

$$GM(x, y) = (P(x, y), FI(x, y)) \quad \text{[Equation 2]}$$

Once the grid map 150 is generated, then the position recognition 110 can provide the position-information of the second robot 130 to the first robot 120.

In order to obtain the position-information of the second robot 130, the first robot 120 needs to register its identifier 122.

To register identifier, the first robot 120 transmits an identifier-registration-request including a robot name RN and an identifier image IM to the position recognition apparatus 110.

When a registration of identifier is finished, the first robot 120 can move on the floor 104 by using a position-information provided by the position recognition apparatus 110. When the first robot 120 requests a position-information to the position recognition apparatus 110 right after the registration of the identifier without moving anywhere, the position recognition apparatus 110 provides (0,0) on the grid map 150 as a position value. However, when the first robot 120 moves to a position of the second robot 130 having identifier 132 and then requests a position-information to the position recognition apparatus 110, the position recognition apparatus 110 detects an image area in which the identifier 132 of the second robot 130 is included from the floor image 140, and then provide a position value of a cell, for example, position value (1, 1) of cell 154, in the grid map 150 corresponding to the detected image area.

Figure 2:
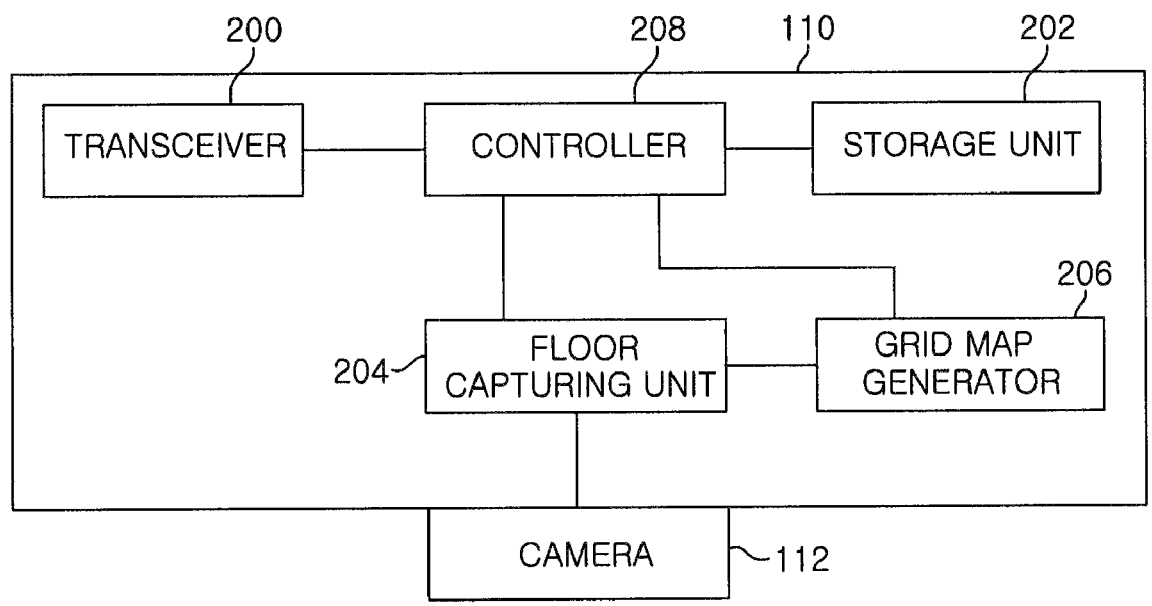
FIG. 2 is a block diagram showing a structure of a position recognition apparatus in accordance with an embodiment of the present invention.

FIG. 2 is a block diagram showing a structure of a position recognition apparatus in accordance with an embodiment of the present invention.

Referring to FIG. 2, the position recognition apparatus 110 includes a transceiver 200, a storage unit 202, a floor capturing unit 204, a grid map generator 206, and a controller 208.

Under the control of the controller 208, the transceiver 200 performs data-transceiving with at least on robot in the indoor space 100 through a wireless communication network. The storage unit 202 stores an operation program of the position recognition apparatus 110, and allows an execution of the operation program on request of the controller 208. Also, the storage unit 202 stores the floor image 140 captured by the camera 112, the grid map 150 delivered from the controller 208, and profile of each robot (i.e., robot name or identifier).

The floor capturing unit 204 captures the floor 104 of the indoor space 100 in which the position recognition apparatus 110 is installed, and delivers the captured floor image 140 to the controller 208 and the grid map generator 206.

The grid map generator 206 receives the capture floor image 140 from the floor capturing unit 204. The grid map generator 206 constitutes a grid map 150 divided into cells of predetermined size based on the capture floor image 140, and then delivers the grid map 150 to the controller 208.

The controller 208 controls each element of the position recognition apparatus 110. When the controller 208 receives an identifier-registration-request of a robot from the transceiver 200, the controller 208 controls the profile of the robot to be stored in the storage unit 202, and performs registration of the identifier.

When receiving a the position-information-request of a robot from the communication part 200, the controller 208 controls the floor capturing unit 204 to capture the floor by using the camera, extracts the identifier of the robot from the captured image, maps an image area to which the identifier belongs onto the grid map, and transmits a position-information of a cell corresponding to the image area to the robot.

Figure 3:
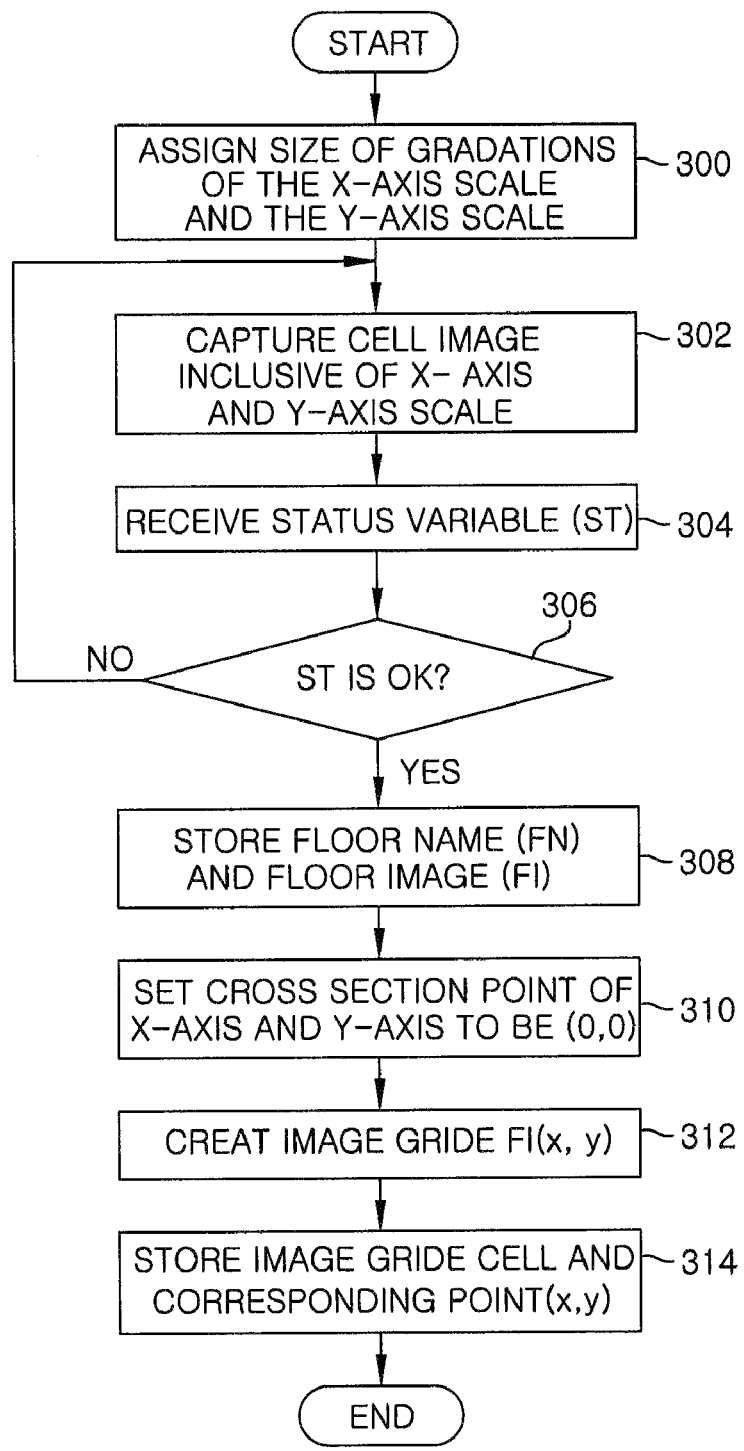
FIG. 3 is a flowchart describing an operation of the position recognition system in accordance with an embodiment of the present invention.

FIG. 3 is a flowchart describing an operation of the position recognition apparatus in accordance with an embodiment of the present invention.

Referring to FIG. 3, in step 300, the position recognition apparatus 110 assigns sizes of gradations of the X-axis scale and the Y-axis scale on the floor 104. Then, in step 320, the cell image FI(x, y) 140 and the X-axis scale and the Y-axis scale are captured by the camera 112.

In step 304, a status variable ST is received to check a status of the capture floor image FI 140.

In step 306, if the status variable ST is OK, proceeding to step 308 where a floor name FN stored in the storage unit 202 and corresponding floor image FI 140 are stored in a form of (FN, FI), and then moving to step 310. However, in step 306, if the status variable ST is NO, returning to step 302, the camera captures the floor image again. This may be because the image is erroneously captured due to environmental cause or a malfunction of the camera.

In step 310, the cross section point 142 of the X-axis and the Y-axis on the floor image 140 is set to be a center point (0, 0) of the grid map. In step 312, the image grid FI(x, y) 150 divided by unit cells, which are defined by the gradations of the X-axis and the Y-axis on the floor image 140, is generated.

Afterward, in step 314, the grid map construction is finished by storing each image cell FI(x, y) in the image grid and each point P(x, y) corresponding thereto, on the grid map (GM).

Here, the point P(x, y) corresponding to the image cell, and the grid map GM(x, y) are defined as follows.

$P(x, y) = \{(x, y) |$

Figure 4:
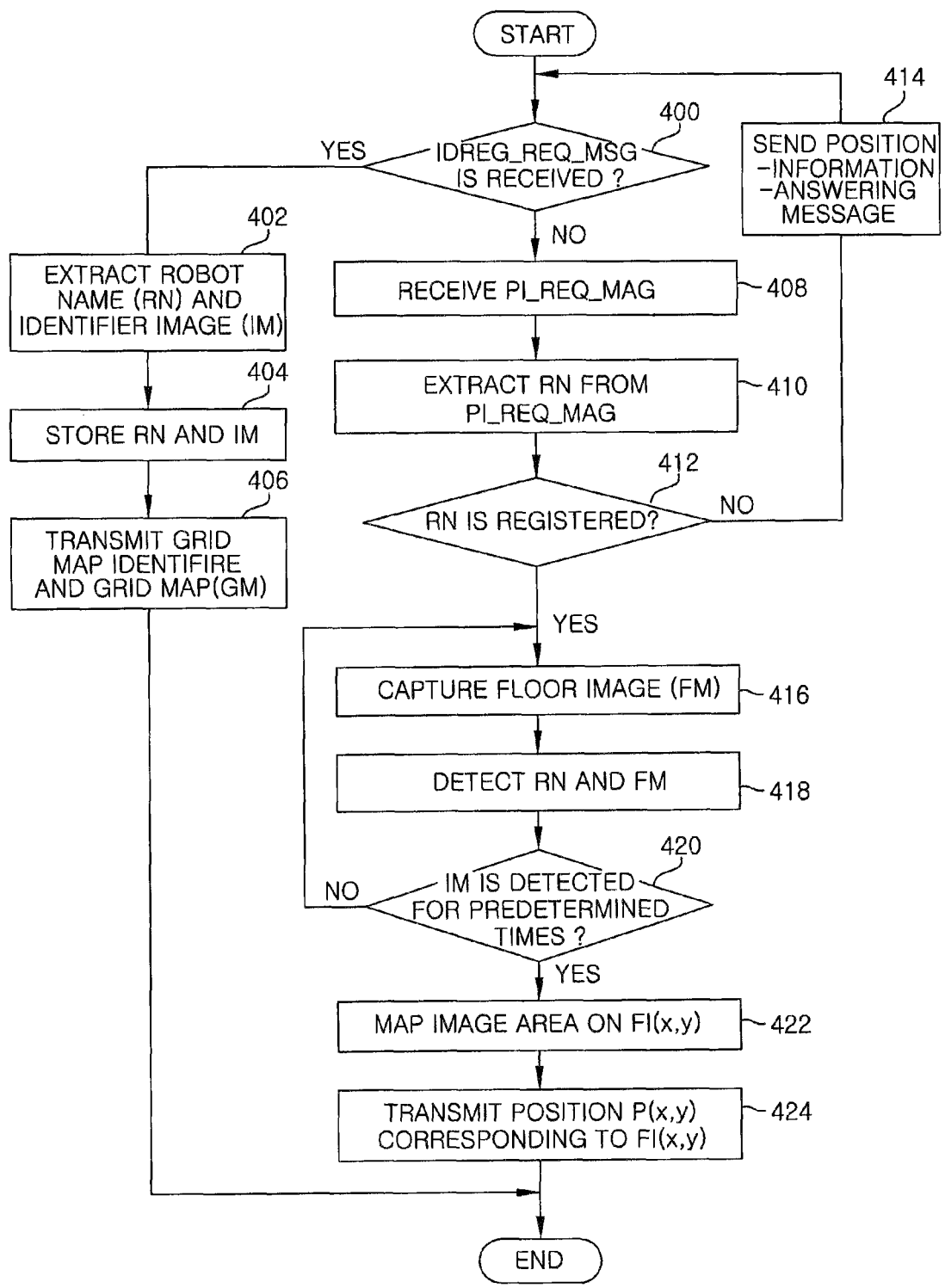
FIG. 4 is a flowchart describing a process of providing a position-information from the position recognition system to a robot in accordance with an embodiment of the present invention.

−|the number of grids on left side from (0, 0)+1|≤x≤|the number of grids on right side from (0, 0)+1|, −|the number of grids on down side from (0, 0)+1|≤y≤|the number of grids on up side from (0, 0)+1|, $(x \neq 0 \wedge y \neq 0)\}$ $GM(x, y) = (P(x, y), FI(x, y))$ FIG. 4 is a flowchart describing a process of providing a position-information from the position recognition apparatus to a robot in accordance with an embodiment of the present invention.

Referring to FIG. 4, a robot, for example the first robot 120, transmits an identifier-registration-requesting message IDREG_REQ_MSG including a robot name RN and identifier image IM to the position recognition apparatus 110, to register identifier to the position recognition apparatus 110. Also, the first robot 120 which finishes the registration of the identifier may transmit a position-information-requesting message PI_REQ_MSG to the position recognition apparatus 110, when the first robot 120 moves in the indoor space 100.

In step 400, it is determined whether the identifier-registration-requesting message IDREG_REQ_MSG is received from the robot, for example the first robot 120. When the identifier-registration-requesting message IDREG_REQ_MSG is determined to be received, then the process proceeds to step 402. However, when the position-information-requesting message PI_REQ_MSG is determined to be received other than the identifier-registration-requesting message IDREG_REQ_MSG, then the process proceeds to step 408.

In step 402, the robot name RN and the identifier image IM are extracted, and in step 404, a pair of the robot name RN and the identifier image IM is stored in the storage unit 202.

Then, a grid map identifier of the grid map GM, which is constructed based on the floor in which the first robot moves, and an identifier-registration-completion message including the grid map GM are transmitted to the first robot. Through this, the first robot may be provided with a position-information of the floor where the robot is positioned from the position recognition apparatus 110.

Meanwhile, in step 408, as explained above, the position recognition apparatus 110 receives the position-information-requesting message PI_REQ_MAG other than the identifier-registration-requesting message.

In step 410, the position recognition apparatus 110 extracts the robot name RN from the position-information-requesting message PI_REQ_MAG, and, in step 412, verifies whether the robot having the robot name RN extracted in step 410 is already registered.

When it is determined that the robot is not registered, then the process moves to step 414. In step 414, a position-information-answering message refusing the request of the position-information is transmitted to the first robot, or a message guiding the registration of the identifier is provided, and then the process returns to step 400.

However, the first robot is determined to be already registered, then moving to step 416 where the floor image FM is captured by the camera 112 in order to provide a position-information to the first robot. In step 418, the robot name RN and the identifier image IM are detected from the floor image FM. The step for detection of the robot name RN and the identifier image IM may be iterated for predetermined times.

In step 420, if the identifier image IM is not detected for predetermined times, then returning to step 416, the floor image FM is newly captured, and the identifier image IM may be re-detected form the newly capture floor image FM. However, if the identifier image IM is not detected for predetermined-retrying times, the process may be finished or moves to step 414, that a position-information refusing message may be transmitted to the robot.

In step 420, if the identifier image IM is successfully detected within the predetermined-retrying times, then in step 422, the image area including the detected identifier image IM is mapped on a cell image FI(x, y) of the grid map GM. Then, in step 424, a position value P(x, y) corresponding to the cell image FI(x, y) of the grid map GM is transmitted to the first robot.

As explained above, in accordance with an embodiment of the present invention, a camera-based indoor position recognition method includes: a step for capturing a floor image by controlling a camera installed on a ceiling of an indoor space; a step for constructing a grid map including cell images and position values by dividing the captured floor image into cells of a predetermined size and assigning the position values to the cells; a step for performing a wireless data communication with a robot in the indoor space; and a step for controlling the floor capturing unit and the grid map generator, and providing an identifier-registration and a current position-information to the robot in accordance with an identifier-registration-requesting message and a position-information-requesting message of the robot, wherein the identifier-registration-requesting message and the position-information-requesting message of the robot are delivered from the transceiver.

While the invention has been shown and described with respect to the embodiments, it will be understood by those skilled in the art that various changes and modification may be made without departing from the scope of the invention as defined in the following claims.

What is claimed is:

1. A camera-based indoor position recognition apparatus comprising:
    a floor capturing unit capturing a floor image by controlling a camera installed on a ceiling of an indoor space;
    a grid map generator constructing a grid map including cell images and position values by dividing the captured floor image into cells of a predetermined size and assigning the position values to the cells;
    a transceiver performing a wireless data communication with a robot in the indoor space; and
    a controller controlling the floor capturing unit and the grid map generator, and providing an identifier-registration and a current position-information to the robot in accordance with an identifier-registration-requesting message and a position-information-requesting message of the robot, wherein the identifier-registration-requesting message and the position-information-requesting message of the robot are delivered from the transceiver.

2. The apparatus of claim 1, wherein, when the controller receives the identifier-registration-requesting message of the robot, the controller extracts a robot name and an identifier image from the identifier-registration-requesting message, and registers an identifier of the robot.

3. The apparatus of claim 1, wherein, when the controller receives the position-information-requesting message, the controller captures the floor image by controlling the floor capturing unit; detects an identifier of the robot from the captured floor image; maps an image area to which the identifier belongs onto the grid map; and transmits a position-information of the cell, where the identifier is detected, to the robot.

4. The apparatus of claim 1, further comprising: a storage unit storing an operation program of the apparatus and storing a robot name and an identifier image of the robot.

5. The apparatus of claim 1, wherein the floor capturing unit captures the floor image together with an X-axis scale and a Y-axis scale crossing each other on a floor of the indoor space.

6. The apparatus of claim 5, wherein the floor is divided into the cells having the predetermined size by gradations of the X-axis scale and the Y-axis scale.

7. The apparatus of claim 1, wherein the grid map generator establishes an intersection point of an X-axis scale and a Y-axis scale to be a center point of the grid map, and generates an image grid having the cells as unit based on gradation of the X-axis scale and the Y-axis scale.

8. The apparatus of claim 1, wherein the grid map generator constructs the grid map by storing the cell images and points corresponding to the cell images on the image grid.

9. A camera-based indoor position recognition method comprising:
   capturing, at a floor capturing unit, a floor image by controlling a camera installed on a ceiling of an indoor space;
   constructing, at a grid map generator, a grid map including cell images and position values by dividing the captured floor image into cells of a predetermined size and assigning the position values to the cells;
   performing, at a transceiver, a wireless data communication with a robot in the indoor space; and
   controlling, at a controller, the floor capturing unit and the grid map generator, and providing an identifier-registration and a current position-information to the robot in accordance with an identifier-registration-requesting message and a position-information-requesting message of the robot, wherein the identifier-registration-requesting message and the position-information-requesting message of the robot are delivered from the transceiver.

10. The method of claim 9, wherein said controlling the floor capturing unit and the grid map generator, when the controller receives the identifier-registration-requesting message of the robot, the controller extracts a robot name and an identifier image from the identifier-registration-requesting message, and registers an identifier of the robot.

11. The method of claim 9, wherein said controlling the floor capturing unit and the grid map generator includes:
   capturing the floor image by controlling the floor capturing unit, when the controller receives the position-information-requesting message;
   detecting an identifier of the robot from the captured floor image;
   mapping an image area to which the identifier belongs onto the grid map; and
   transmitting a position-information of the cell, where the identifier is detected, to the robot.

12. The method of claim 9, further comprising: storing an operation program of the method and storing a robot name and an identifier image of the robot.

13. The method of claim 9, wherein said capturing a floor image includes capturing the floor image together with an X-axis scale and a Y-axis scale crossing each other on a floor of the indoor space.

14. The method of claim 13, wherein the floor is divided into the cells having the predetermined size by gradations of the X-axis scale and the Y-axis scale.

15. The method of claim 9, wherein said constructing a grid map includes:
   establishing an intersection point of an X-axis scale and a Y-axis scale to be a center point of the grid map; and
   generates an image grid having the cells as unit based on gradation of the X-axis scale and the Y-axis scale.

16. The method of claim 15, wherein said constructing a grid map includes:
   constructing the grid map by storing the cell images and points corresponding to the cell images on the image grid.

17. A camera-based indoor position recognition method comprising:
   transmitting an identifier-registration-requesting message including a robot name and an identifier image of a robot to a position recognition apparatus, wherein the robot is located in an indoor space and the robot is wirelessly connected with the position recognition apparatus;
   receiving a identifier-registration-completion message from the position recognition apparatus;
   transmitting a position-information-requesting message including the robot name of the robot to the position recognition apparatus; and
   receiving a position-information-answering message including a current-position-information from the position recognition apparatus.

18. The method of claim 17, wherein the identifier-registration-completion message includes: a grid map identifier for a floor where the robot is located; and a grid map containing a position-information.

19. The method of claim 17, wherein the position-information-requesting message includes a robot name pre-registered in the position recognition apparatus.

20. The method of claim 17, wherein the identifier is attached on top of the robot.

* * * * *